PLURAL MOTOR TORQUE CONTROL FOR TAPE TRANSPORT MECHANISM

Original Filed Jan. 31, 1958

INVENTOR.
JOHN T. MULLIN
BY
Lippincott, Smith & Ralls
ATTORNEYS

INVENTOR.
JOHN T. MULLIN

BY

Lippincott, Smith & Ralls
ATTORNEYS

United States Patent Office 3,444,445
Patented May 13, 1969

3,444,445
PLURAL MOTOR TORQUE CONTROL FOR TAPE TRANSPORT MECHANISM

John T. Mullin, Beverly Hills, Calif., assignor to Minnesota Mining and Manufacturing Company, St. Paul, Minn., a corporation of Delaware Continuation of application Ser. No. 712,537, Jan. 31, 1958. This application Jan. 15, 1962, Ser. No. 173,849
Int. Cl. H02p 7/74
U.S. Cl. 318—7 15 Claims This is a continuation of copending application Ser. No. 712,537 filed Jan. 31, 1958, by John T. Mullin for Torque Control for Tape Transport Mechanism Motors.

This invention relates to tape transport mechanisms in magnetic recording machines, and more particularly to a torque control for the take-up and rewind motors of a tape transport mechansim.

Recording machines which employ a tape upon which the information is to be magnetically stored require a tape transport mechanism which will move the tape in forward and reverse directions. Generally there are provided a plurality of stationary or rotating guides over which the tape must pass in flowing from a supply reel to a take-up reel and vice versa. In one specific application the machine has eight stationary and one rotary guide about which the tape passes in flowing from one reel to another. In such cases, the initial restraining tension due to the inertia of the supply reel, in the order of one ounce will make it impossible to wind the tape on a take-up reel because of the exceedingly high coefficient of friction developed by the snubbing action of the tape against the guides.

Since it is always necessary in a professional tape recording machine to provide for running of the tape forward at high speed in order to find a specific place in the tape, and the additional requirements for rapid rewind and a normal forward speed for running, it is an object of this invention to reduce the effect of the initial inertia of the tape supply reels, and the consequent starting friction on the tape, to an initial negative value, and since the mass of the tape and its light inherent friction on the guides is almost negligble, the effect of the snubbing of the tape on the guides will be almost completely eliminated.

It is another object of this invention to provide electrical braking for bringing the reels, and consequently the tape, to a standstill, and holding the tape at a standstill in a standby condition, without any creeping of the tape occurring. This will obviate the necessity for any mechanical braking means to stop the reels and to hold them in the stopped condition.

The above and other objects are attained by practicing this invention which provides, among its features, a relationship established between the take-up and rewind motors employed to drive take-up and supply reel respectively. As a tape is to be run rapidly in one direction, the supply motor, for instance, will be activated at a given torque value to produce a "drive-out" torque as the take-up motor starts its operation. The supply motor will continue to cause the supply reel to pay out the tape at a speed which is equal to or initially greater than the speed at which the tape is wound on the take-up reel in response to the action of the take-up motor. A second relationship between the supply motor and the moving tape is also established whereby the supply motor is excited in a direction opposite to the direction which the tape is moving to establish a torque in this opposite direction to bring the tape to a gentle stop without the use of mechanical braking means. With the tape at a standstill, an electrical standby low-torque is applied to each motor, in opposite directions, to keep the tape under tension. The value of the standby torque so applied is sufficient to keep the tape under tension, but of insufficient value to permit creepage of the tape in either direction. Also, since the tensions on the tape, in the standby condition, are in opposite directions, due to the aforementioned snubbing action, the tape cannot possibly crawl.

Other objects and advantages will become apparent from a consideration of the following detailed description taken in conjunction with the accompanying drawings, wherein:

FIGURE 1 shows schematically the essentials of the tape transfer mechanism of a magnetic recorder or reproducer, illustrating the tape path with which the present invention can be employed. There may be various modifications in the tape path, but that shown in FIGURE 1 can be considered typical.

Figure 1:
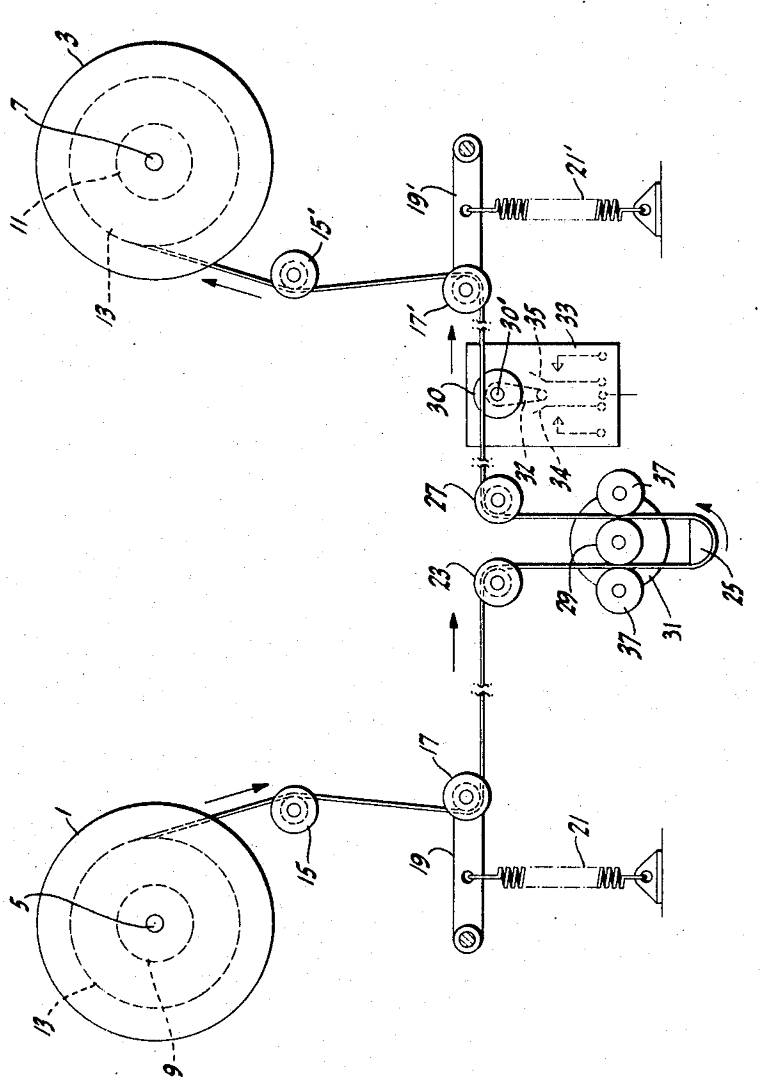
FIGURE 1 is a schematic diagram illustrating in simplified form a tape transport mechanism as employed in a recording machine.

In the equipment symbolically illustrated, a pay-out or supply reel 1 and a take-up reel 3 are mounted, respectively, on shafts 5 and 7 of reel driving motors indicated by the dotted circles 9 and 11. The two reels are identical and interchangeable, and are mounted upon the shafts in such manner as to minimize any eccentricity or play in the mounting. A tape 13 is coiled on the two reels so that the transfer mechanism will move the tape between the reels. The direction of movement of the tape, in the normal operating condition of the machine, is indicated by the arrows shown parallel to the path. As shown, the tape as it comes at changing angles off the pay-out reel 1, passes first over a guide post or roller 15 which directs it at a substantially constant angle over a similar guide 17, which may be mounted on the end of a pivotally-mounted tension arm 19 urged into contact with the tape by resilient means. In passing over the roller or guide post 17, the tape makes an approximately right-angle turn and passes over a fixed guide 23, where it again makes a right-angled bend to make a loop around the transducer head 25 and then back, substantially parallel to its path from guide 23, to a similar guide 27. From guide 27 the tape passes over the face of a flat roller disc 30 fixedly carried on the upper end of a switch arm shaft 30'. Movement of the tape over the disc will, by frictional drag, impart rotation to the shaft in the direction of travel of the tape and cause the switch arm 32 in a drag switch 33 to move in a corresponding direction to close upon either forward sense contact 34 or a rewind sense contact 35, to reflect the direction of travel of the tape. Tape 13 then passes over a guide 17' connected to a tensioning mechanism, substantially identical to that of the tension-arm 19, and designated at 19'. Leaving the guide 17' the tape passes over the guide or roller 15', similar to the guide or roller 15, and thence onto the take-up reel. For some applications of the recording machine, there may be more fixed or roller guides than the number shown in FIGURE 1, over which the tape will travel in its path from one reel to the other.

The tape is driven, as it approaches and leaves the transducer heads 25 in its path to and from the guides 23 and 27, in normal operation, by a capstan 29 driven by a motor 31. The tape is maintained in contact with the driving capstan by friction rollers 37, pressing in from either side of the tape in its passage over the capstan. With reference to the circuit of FIGURE 2, the motors 9 and 11 are shown with their respective fields indicated at 41 and 43 and respective armatures indicated at 45 and 47. The motors 9 and 11 are of the DC, shunt-wound type, and may be standard commercial motors. These motors are customarily supplied to operate on a nominal 120 volt supply and are built with two field windings connected in series. While it is possible to use such a motor without modification, it is advisable to connect the two field windings in parallel, as shown by the field windings 41 and 43, to give a normal field excitation from a −60 volt source. Thus, this is the arrangement adapted in the particular equipment employed.

Figure 2:
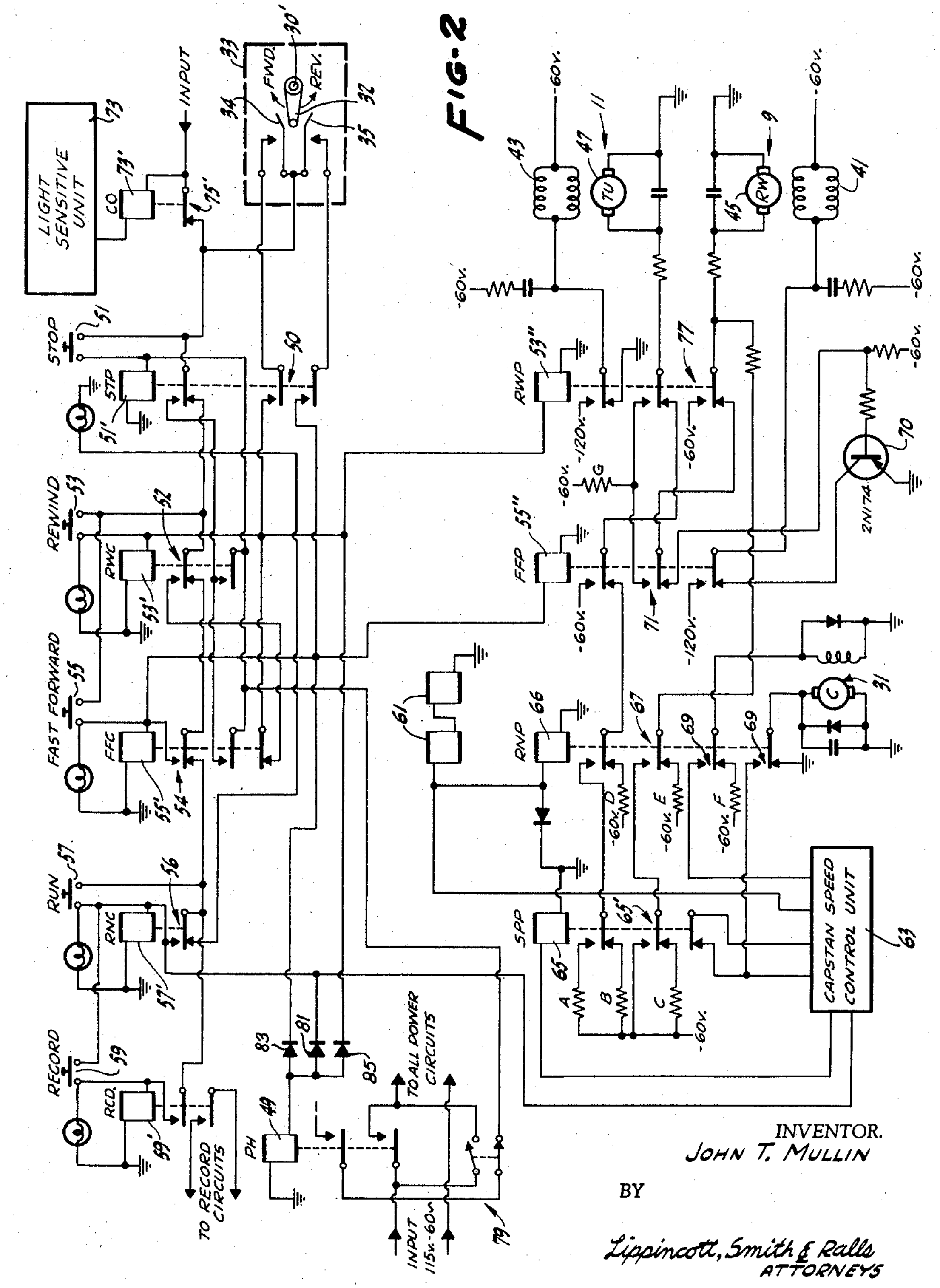
FIGURE 2 is a schematic diagram showing the circuitry and interrelated elements embodying the invention.

Input power for the circuit shown in FIGURE 2 is supplied through a conventional transformer, and full-wave rectifier circuits are used for developing the various voltages shown (e.g. −60, −120, etc.) through a large filter conductor in a well-known and conventional manner. The positive connection may be directed to ground or to separate positive leads provided therefor, as a matter of engineering choice.

Motor circuits fed by the power supply are all inductive, tending to keep current flowing in a constant value. This current is supplied between cycles from a charge in the storage condenser conventionally used. The charge is sufficient to supply DC for several seconds after the AC supply is cut off and thus supplies braking torque through a PH relay 49, in a manner which will hereinafter be described. The manner in which the current is supplied, as above described, is conventional and is, therefore, not shown on the circuit diagram of FIGURE 2.

With continued reference to the circuit of FIGURE 2 a switching means is provided which includes top row contacts 51, 53, 55, 57 and 59 associated with the top row relays 51′, 53′, 55′, 57′ and 59′ respectively, and which represents the stop rewind, fast forward, normal run and record conditions, respectively, to be imposed upon the machine. The top row contacts are "hold" contacts, except stop 51, which keep an associated relay excited when the push button of one top contact is released. Stop contact 51 will release upon discontinuation of pressure thereon. It will be seen by tracing out the push button contact control circuits that the actuation of the relay associated with respective ones of them, except stop contact 51, serves to hold the circuit closed when the momentary-contact push button, associated with each of the respective top row contacts, is released, and their various contacts are so interconnected that the actuation of any one of these relays releases any other that may have previously been operated.

In the practice of this invention there are several conditions of the tape transport mechanism which will obtain, and among these are:

(1) Tape-transport mechanism stopped—opposite small torque on both reels 1 and 3—capstan 29 off.

(2) Normal run—opposite small tensions on both reels—capstan on.

(3) Fast-forward—forward torque on both reels—capstan off.

(4) Fast-rewind—backward torque on both reels—captans off.

(5) Normal stop—current reversed on either motor 9 or 11 until they stop and reverse, when normal condition 1 above obtains.

(6) Accidental stop (main switch open while the tape-transport mechanism is running)—PH 49 relay holds to apply the normal stop conditions as in condition 5 above.

Considering initially, condition 1 above, wherein the tape-transport mechanism is stopped, reference to FIGURE 2 will show that minus 60 v is applied by the input power through resistors D and E to the armature of the motors 9 and 11 respectively, to supply a small voltage across the armatures of the motors. The values of the resistors D and E are chosen so as to provide a normal stand-by low torque in opposite directions on the motors, which in turn places an opposite small torque upon reels 1 and 3. The input power through resistors D and E provides a voltage sufficient to establish the normal stand-by low torque, but is of insufficient value to develop a torque which will result in creepage of the tape in either direction, even when one reel is full and the other is empty. Since the tensions are in opposite directions, and due to the snubbing action between the tape and the guides, the tape cannot possibly crawl. Thus, it is that mechanical brakes are completely unnecessary on the tape-transport mechanism in the stopped or stand-by condition since the tape can be maintained under tension while standing still. It will be noted that with the tape-transport mechanism in the stopped condition 1, the capstan 31 is off; i.e. not in driving contact with the tape since the friction rollers 37 will be out of pressing relation with the tape as a result of action of capstan solenoids 61.

To set the tape-transport mechanism in its normal run condition, condition 2 enumerated above, a normal run circuit is energized by the push button of the run contact 57 being momentarily pressed and then released so that the relay 57′ is actuated to close its upper contact 56. This, in turn, energizes the capstan motor 31 to drive it through a capstan speed control unit 63. Since this unit is not directly involved in this invention it is sufficent to state that it operates to actuate the capstan solenoids 61 speed power relay 65 and the run power relay 66 when the contact 57 is pressed and thereafter when the capstan motor 31 come up to speed it releases the speed power relay 65. The capstan motor 31 is operated when the contacts 69 of the run power relay are operated. As the tape transport mechanism comes up to speed, the capstan solenoids 61 move the friction rollers 37 into engagement with the tape at the capstan, whereby the capstan 29 applied a driving force on the tape. Thus, the tape will flow linearly from the supply to the take-up reel. As will be evident in FIGURE 2, a set of contacts 67, operated by excitation of the run power relay 66, will be moved to the upper position from the position shown in FIGURE 2, and the connections from resistors D and E to the motors are opened. However, the tension on the armatures of the motors 9 and 11, providing the opposite tensions on the reels 1 and 3, will now be delivered through the resistors A or B and C, depending upon the position of the set of contacts 65′ operated in response to excitation of the speed power relay 65. Thus, there is provided a small opposite tension on both reels on the normal run condition of the tape-transport mechanism so that the tape flowing between the reels will be held under an average tension. The resiliently urged lever arms 19 and 19′ now function to take up any variation of tape speed resulting from inevitable eccentricity in its winding on the supply and take-up reels.

To have the fast-forward condition obtain, wherein the capstan is off and the tape flows very rapidly from the supply to the take-up reel, a fast-forward circuit is energized by actuation of the contact 55 so that the fast-forward relay 55′ will actuate the fast-forward set of contacts 54 concurrently releasing any "hold" condition of the other top row relays. Since the run contact 57, if in the "hold" condition, will be released, the capstan will not be energized and, consequently, the capstan solenoids 61 cannot operate. Thus the capstan drive will be "off." With the closing of the contact 55, and the consequent holding action, the fast-forward power relay 55″ will cause the movement of the set of contacts 71 to move from its lower inactive position shown in FIGURE 2 to its active upper position. In this latter position the standby low torque delivered through resistors D and E (or through resistors A or B and C) will be discontinued by the opening of the connection between resistors D and E and the armatures of the motors 9 and 11 at set of contacts 71 of the relay 55″. At the same time the armature of the rewind motor is supplied with input current through resistor G; the field of the take-up motor 11 is subjected to a full −60 v. from the input current; and the armature of the take-up motor is energized directly by its connection to the −60 v. input supply through the uppermost contact of the set of contacts 71. This results in the condition where the take-up motor 11 is pulling with a high torque and the rewind motor 9 feeds out the tape at an initial speed equal to or faster than the initial speed of the rewind motor and continues to feed out the tape as fast as it is wound upon the take-up reel 3. This fast-forward condition will continue until another one of the top row contacts are actuated, for instance, stop 51, or when the tape has run out by completely transferring all of the tape from the take-up reel back to the supply reel, or the tape has broken in travelling between the reels.

Where the tape has run out or has broken a light-sensitive unit 73 will be energized, as by a phototransistor or any other suitable manner known to those skilled in the art, to actuate the CO relay 73′ and open contacts 75. This cuts off the current for actuating all top-row relays. This will stop further operation of any top-row relay and current to the top-row relays can be supplied again only upon the closing of relay contact 75.

To operate the tape transport mechanism in the fast-rewind condition, a rewind circuit is excited when the rewind contact 53 is actuated so that its associated push button will energize the hold contact and release all of the other hold contacts across the top row relays and prevent the capstan and capstan solenoids from operating so that the capstan drive will be "off." Actuation of the rewind relay 53′, as a consequence of actuating contact 53, will cause the movement of the set of contacts 52 from its normal to its upper active position so that it is connected into the stop relay 50 and is also connected to the rewind power relay 53″ to energize this latter relay. Energizing relay 53″ will operate relay contacts 77. This causes a reversal of the current through the field of the take-up motor 11 because the field 43 of motor 11 which was connected to ground from −60 v. is now connected to −120 v. Simultaneously, input current through resistor G will now be connected into the armature of the take-up motor 11 and will change the value of the armature previously established by the voltage supplied through resistor D (or through resistors A or B) to a higher value. Resistor G is selected to provide the correct feed-out or reverse torque to motor 11. Meanwhile the armature of the rewind motor 9 is connected directly to the −60 v. bus of the input power by another pair of the contacts on the relay 77. A transistor 70, which is connected through a set of contacts 71, in their normal position, to field 41 of motor 9, remains highly conductive due to a voltage drop across its base, and consequently the field 41 experiences no change in current. This results in the condition where the rewind motor 9 pulls with high torque and the take-up motor 11 feeds out the tape at an initial rate of speed equal to or greater than the speed at which the tape is wound upon the supply reel 1, and continues to feed out tape as fast as it is wound so long as the fast rewind condition obtains, or until the tape runs out or breaks to actuate unit 73 in the manner herebefore described.

To achieve a normal stop condition, a stop circuit is provided wherein the current of the payout motor or of the take-up motor is reversed until the reels 1 and 3 stop and reverse a few degrees of rotation in the opposite direction, at which time the normal stop condition will obtain. This stop condition is brought about by the operation of the stop relay 51′ which is actuated by the push button associated with contact 51. The drag switch 33 which cuts off the current to all of the other relays except those supplied through the contacts of drag switch 33 which has been actuated in one or the other direction, is now connected into the circuit and causes either the rewind power relay or the fast-forward power relay to operate, depending upon the sense in which the tape is moving. This condition persists until the tape comes to a standstill and begins to move in the opposite direction. At this time the contact switch arm 32 of switch 33 will open, all relays will be released, and the stand-by tension is established through resistors D and E so that the stopped condition will result.

In the event that the main switch 79 is inadvertently opened while the tape transport mechanism is running, the PH relay 49 which is supplied with DC potential from the storage condenser in the input supply circuit for several second after the AC supply is cut off, will keep operating and a minus voltage will be applied to the stop relay 51′. This will cause either the rewind solenoid 53′ of the fast-forward solenoid 55′ to be energized, depending upon the position of the drag switch 33. Whichever of these relays is energized, locks the stop relay 51′ operating, and the relay so caused to operate stays operating until the tape has gone to a standstill and has been reversed through a few degrees of rotation of the reel acting as the take-up reel. During this sequence of events the PH relay 49 is operative, keeping power on in all circuits. When the sense switch 33 opens as a result of the reversal through a few degrees of rotation, that is, no longer indicating a forward or reverse sense for the movement of the tape; the rewind, fast-forward and the stop relays are released. Since PH relay 49 no longer has a supply of power, it is released, which in turn shuts off the power to all circuits. This provides a protective measure preventing the reels from running wildly if the main power switch is turned off inadvertently since the machine relies upon dynamic braking to bring the tape to a gentle stop and, if power were disconnected, immediately upon the opening of the main power switch 81 there would be no such braking effort.

The rectifiers 81, 83 and 85 which are connected to the PH relay 49 and to run, fast-forward and rewind relays respectively, enables PH relay to be operative whenever one of the run, fast-forward or rewind solenoids is operated. The rectifiers prevent picking up the two relays which should not operate whenever the third is operating. The PH relay itself is provided to keep the power on if the main power switch is shut off if the machine is running in any one of the three conditions, run, fast-forward or rewind. The main power switch 79 is actually a double-pole double-throw toggle switch symbolically in FIGURE 2 below the PH relay 49. In the schematic of FIGURE 2, the main switch is shown in the "off" or open position.

From the foregoing it will be apparent that there has been provided in a tape transport mechanism which includes a tape driving means for imparting linear movement to the tape so that the tape can be transferred between a pair of spaced reels under normal operating conditions, a separate motor for actuating each of the pair of reels, means in the form of an electric circuit including means for applying a small torque in opposite directions to said motors to maintain the reels in a position of rest and the tape under a slight tension in the standby condition of the mechanism, and switching means included in the circuit for energizing the motors to simultaneously actuate both reels to run in the same direction, while the tape driving mechanism is in driving engagement with the tape, to thereby overcome the tension on the tape and the initial inertia of the reels at their position of rest. Also, means are included in the circuit for exciting, alternatively, each of the motors to actuate each of the reels as a take-up or as a supply reel depending upon the direction in which they are actuated to run, and means for exciting the motor actuating the reel from which the tape is being payed out in a direction opposite to the direction of travel of the tape to apply a braking force bringing the reels to a stop. The application of the braking force can be selectively applied to the mechanism while it is in its normal run, fast-forward or rewind condition of operation.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A tape transport mechanism for transferring a tape between first and second tape reels, a first reversible motor for driving the first reel in either of two opposite directions, a second reversible motor for driving the second reel in either of two opposite directions, first means normally coupled to said first and second motors for energizing said first and second motors to drive the first and the second reels in opposite directions whereby tension is maintained on the tape, second means coupled to said first and to said second motors for energizing said first and second motors to drive the first and the second reels at torques different from each other but in the same direction for an acceleration of the tape to an operating speed, switching means coupled to the first and second energizing means for disconnecting said first energizing means from said motors and for coupling said second energizing means to said motor to obtain an acceleration of the tape, means coupled to said switching means for reversing the polarity of the energizings applied by said first and second energizing means to said first and said second motors to bring the tape to a standstill and initiate the movement of the tape in the opposite direction, and means controlled by said reversing means when the tape movement is initiated in the opposite direction for disconnecting said second energizing means from said motors and reconnecting said first energizing means to said motors to restablish tension on the tape at standstill.

2. A tape transport mechanism for transferring a tape between first and second tape reels, a first reversible motor for driving the first reel in either of the directions, a second reversible motor for driving the second reel in either of two directions, first means normally coupled to said first and to said second motors for energizing said first and second motors to drive the first and the second reels in opposite directions whereby tension is maintained on the tape at standstill position of the tape, second means coupled to said first and to said second motors for energizing said first and second motors to drive the first and the second reels at torques different from each other but in the same direction for an acceleration of the tape to an operating speed, switching means coupled to the first and second energizing means for disconnecting said first energizing means from said motors and for coupling said second energizing means to said motors to obtain an acceleration of the tape to the operating speed, delay means coupled to said switching means and effective upon a power failure for reversing the polarity of the energizings applied by said connectable means to said first and said second motors to brake the first and second reels until the tape reaches standstill, and means coupled to the tape and responsive when the tape reaches standstill for disabling said reversing means.

3. In a tape transport mechanism for transferring a tape between a pay-out reel and a take-up reel, first motive means operatively coupled to the pay-out reel for driving the pay-out reel, second motive means operatively coupled to the take-up reel for driving the take-up reel, an actuatable stop switch means operatively coupled to the first and second motive means and operatively coupled to the stop switch and responsive to the actuation of the stop switch for energizing the first and second motive means to produce equal and opposite torques on the first and second reels for an inhibition in the movement of the tape, an actuatable run switch, means operatively coupled to the first and second motive means and to the run switch and responsive to the actuation of the run switch for energizing the first and second motive means to produce unequal and opposite torques on the first and second reels in a particular relationship for an acceleration in the transfer of the tape between the pay-out and take-up reels from a position of tape rest and to produce such unequal and opposite torques at all times during the acceleration of the tape from its position of rest, and third motive means responsive to the actuation of the run switch to become operatively coupled to the tape for facilitating the acceleration of the tape and responsive to the actuation of the stop switch to become decoupled from the tape.

4. In a tape transport mechanism for transferring a tape between a pay-out reel and a take-up reel, first motive means operatively coupled to the pay-out reel for driving the pay-out reel, second motive means operatively coupled to the take-up reel for driving the take-up reel, means connected in electrical circuitry with the first and second motive means for obtaining the production of torques in opposite directions on the pay-out reel and on the take-up reel during the transfer of the tape at a normal speed between the pay-out reel and the take-up reel means connected in electrical circuitry with the first and second motive means for obtaining the production of torques in the same direction on the pay-out reel and on the take-up reel during the transfer of the tape between the pay-out reel and the take-up reel at a fast speed above the normal speed, and means connected in electrical circuitry with the first and second motive means for obtaining the production of torques in the same direction for a limited period of time on the pay-out reel and the take-up reel and in a direction opposite to the torques on the reels during the fast transfer of the tape to obtain an interruption in the transfer of the tape between the pay-out reel and the take-up reel.

5. In a transport mechanism for transferring a tape between a pay-out reel and a take-up reel, first motive means operatively coupled to the pay-out reel for driving the pay-out reel, second motive means operatively coupled to the take-up reel for driving the take-up reel, an actuatable run switch, means connected in electrical circuitry with the first and second motive means and with the run switch and responsive to the actuation of the run switch for obtaining an operation of the first and second motive means to produce first torques in opposite directions on the first and second motive means during the transfer of the tape between the pay-out reel and the take-up reel at a normal speed, an actuatable fast wind switch, and means connected in electrical circuitry with the first and second motive means and with the fast wind switch and responsive to the actuation of the fast wind switch for obtaining an operation of the first and second motive means to produce second torques in the same direction on the first and second motive means and of increased magnitudes relative to the first torques to obtain the transfer of the tape between the pay-out reel and the take-up reel at an increased speed relative to the normal speed.

6. In a tape transport mechanism for transferring a tape between a pay-out reel and a take-up reel, first motive means operatively coupled to the pay-out reel for driving the pay-out reel, second motor means operatively coupled to the take-up reel for driving the take-up reel, an actuatable run switch, means connected in electrical circuitry with the first and second motive means and with the run switch and responsive to the actuation of the run switch for obtaining operations of the first and second motive means to produce torques in opposite directions on the pay-out reel and the take-up reel during the transfer of tape at a normal speed between the pay-out reel and the take-up reel and with the torque on the take-up reel being in the direction of movement of the tape, an actuatable stop switch, and means connected in electrical circuitry with the first and second motive means and with the stop switch and responsive to the actuation of the stop switch for obtaining the operation of the second motive means for a limited period of time to reverse the torque on the take-up reel and to increase the magnitude of such reversed torque relative to the torque produced on the take-up reel upon the actuation of the run switch.

7. The combination set forth in claim 6, including a source of voltage, and means connected in electrical circuitry with the first and second motive means and with the source of voltage and responsive to an interruption in the voltage from the source for obtaining the operation of the second motive means for the limited period of time to reverse the torque on the take-up reel.

8. In a tape transport mechanism for transferring a tape between a pay-out reel and a take-up reel,
first motive means operatively coupled to the pay-out reel for driving the pay-out reel,
second motive means operatively coupled to the take-up reel for driving the take-up reel,
means connected in electrical circuitry with the first motive means and the second motive means for obtaining a first operation of the first motive means and the second motive means to obtain movements of the pay-out reel and the take-up reel in the same direction at high speeds for a fast transfer of tape between the pay-out reel and the take-up reel,
means connected in electrical circuitry with the first motive means and the second motive means for obtaining a second operation of the first motive means and the second motive means for a limited period of time in directions opposite to the first operations of such motive means to obtain an interruption in the transfer of the tape between the pay-out reel and the take-up reel,
a source of voltage, and
means operatively coupled to the first motive means and the second motive means and responsive to an interruption in the voltage from the source for obtaining the second operations of the first motive means and the second motive means for the limited period of time in the directions opposite to the first operations of such motive means to obtain an interruption in the transfer of the tape between the pay-out reel and the take-up reel.

9. In a tape transport mechanism for transferring a tape between a pay-out reel and a take-up reel, first motive means operatively coupled to the pay-out reel for driving the pay-out reel, second motive means operatively coupled to the take-up reel for driving the take-up reel, an actuatable fast run switch, means operatively coupled to the first and second motive means and the fast run switch and responsive to the actuation of the fast run switch for obtaining an operation of the first and second motive means to produce torques on the pay-out reel and the take-up reel in a first direction and with magnitudes for a fast transfer of tape beween the pay-out reel and the take-up reel, an actuatable stop switch, and means operatively coupled to the first and second motive means and the stop switch and responsive to the actuation of the stop switch for obtaining an operation of the first and second motive means for a limited period of time to produce torques on the pay-out reel and the take-up reel in a second direction opposite to the first direction during the limited period of time for an interruption in the transfer of tape between the pay-out reel and the take-up reel.

10. The combination set forth in claim 9, including an actuatable run switch, and means operatively coupled to the first and second motive means and responsive to the actuation of the run switch for obtaining operations of the first and second motive means to produce torques on the pay-out reel and on the take-up reel in opposite directions with the torque on the take-up reel being in the direction of movement of the tape and with the torques on the pay-out reel and on the take-up reel being of limited amplitude relative to the torques in the fast run operation for a movement of the tape at a reduced speed relative to the movement of the tape in the fast run operation.

11. In a tape transport mechanism for transferring a tape between a pay-out reel and a take-up reel, first motive means operatively coupled to the pay-out reel for driving the pay-out reel, second motive means operatively coupled to the take-up reel for driving the take-up reel, a source of voltage, means operatively coupled to the first and second motive means and to the source of voltage and responsive to the application of voltage from the source for obtaining an operation of the first and second motive means to produce torques in opposite directions on the pay-out reel and the take-up reel with magnitudes for producing a transfer of the tape between the pay-out reel and the take-up reel, and means operatively coupled to the first and second motive means and to the source of voltage and responsive to an interruption in the voltage from the source for obtaining an operation of the first and second motive means for a limited period of time to produce torques on the pay-out reel and the take-up reel in the direction opposite to the transfer of the tape between the pay-out reel and the take-up reel for an interruption in the movement of the tape.

12. In a tape transport mechanism for transferring a tape between a pay-out reel and a take-up reel, first motive means operatively coupled to the pay-out reel for driving the pay-out reel, second motive means operatively coupled to the take-up reel for driving the take-up reel, a source of voltage, means operatively coupled to the first and second motive means and to the source of voltage and responsive to the application of voltage from the source for obtaining an operation of the first and second motive means to produce torques in a first direction on the pay-out reel and the take-up reel with magnitudes for producing a transfer of the tape at relatively high speeds between the pay-out reel and the take-up reel, means operatively coupled to the first and second motive means and to the source of voltage and responsive to an interruption in the voltage from the source for obtaining an operation of the first and second motive means for a limited period of time to produce torques on the pay-out reel and on the take-up reel in a second direction opposite to the first direction for such limited period to obtain an interruption in the transfer of the tape between the pay-out reel and the take-up reel, and means operatively coupled to the first and second motive means and the source of voltage and responsive to the voltage from the source for obtaining an operation of the first and second motive means in opposite directions and with the torque on the take-up reel being in the first direction to produce a transfer of the tape between the pay-out reel and the take-up reel at a relatively low speed.

13. The combination set forth in claim 4, including means connected in electrical circuitry with the first and second motive means for obtaining the production of torques in the same direction for a limited period of time on the pay-out reel and the take-up reel and in a direction opposite to the torques on the reels during the fast transfer of the tape to obtain an interruption in the transfer of the tape between the pay-out reel and the take-up reel, and means responsive to the interruption in the transfer of the tape between the pay-out reel and the take-up reel and connected in electrical circuitry with the first and second motive means for obtaining the production of torques in opposite directions on the pay-out reel and on the take-up reel with a sufficiently small difference in such torques to maintain the tape at standstill.

14. The combination set forth in claim 6, including, means connected in electrical circuitry with the first motive means and with the second motive means for obtaining an operation of the first motive means and the second motive means to produce torques in opposite directions on the pay-out reel and the take-up reel and with particular magnitudes to maintain the tape at standstill.

15. In a tape transport mechanism for transferring a tape between a pay-out reel and a take-up reel, a first motor for driving the pay-out reel, a second motor for driving the take-up reel, means including a power supply coupled electrically to said first and said second motors for exciting said first and said second motors in a particular relationship to obtain a movement of the tape at an operating speed, and means coupled to said power supply and to said first and said second motors and responsive to an open circuit in the voltage from said power supply for obtaining an excitation of said first and said second motors in a direction opposite to the direction of movement of the tape and for an interval sufficient to brake said first and said second motors to standstill.

References Cited

UNITED STATES PATENTS

| | | | |
|---|---|---|---|
| 3,045,937 | 7/1962 | Johnson | 318—7 |
| 3,104,071 | 9/1963 | Newberg | 242—55 |
| 3,130,357 | 4/1964 | Westlake et al. | 318—7 |
| 3,141,626 | 7/1964 | Hoskin | 242—55 |
| 2,417,795 | 3/1947 | Yardeny et al. | 318—261 |
| 2,449,223 | 9/1948 | Hayman | 318—374 X |
| 2,683,568 | 7/1954 | Lindsay | 242—55 |
| 2,893,653 | 7/1959 | Schulthesis et al. | 242—55 |
| 2,904,275 | 9/1959 | Selsted et al. | 242—55 |
| 2,909,337 | 10/1959 | Lahti et al. | 242—55 |
| 2,938,677 | 5/1960 | Flam et al. | 318—60 X |
| 2,445,430 | 7/1948 | Hirchenroeder et al. | 318—373 X |
| 2,657,870 | 11/1953 | Pettys | 242—55 |
| 2,923,488 | 2/1960 | Gratian et al. | 242—55 |
| 2,633,503 | 3/1953 | Camras | 318—282 X |

FOREIGN PATENTS

| | | |
|---|---|---|
| 933,862 | 8/1963 | Great Britain. |

ORIS L. RADER, *Primary Examiner.*

THOMAS E. LYNCH, *Assistant Examiner.*

U.S. Cl. X.R.

242—55.12, 75.51; 318—60, 374